May 29, 1923.
G. ROBINSON
BOUQUET HOLDER
Filed Sept. 11, 1922
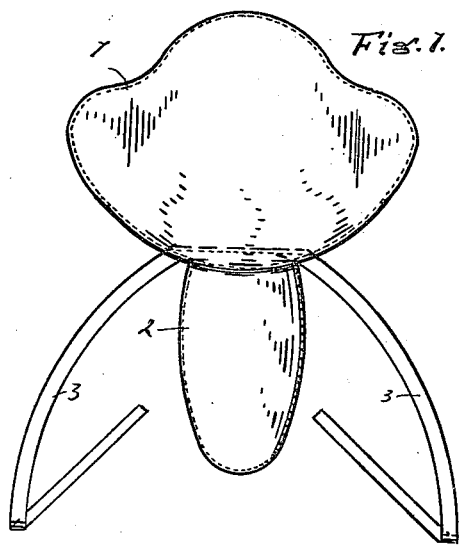
Fig. 1.
Fig. 2.
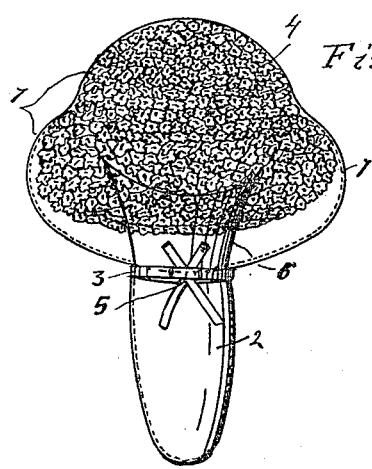
Fig. 3.
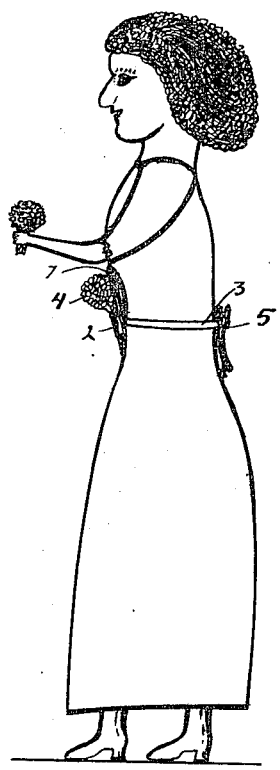
Fig. 4.
Inventor
Georgia Robinson
By *Gehiel J. Cilley*
Attorney Patented May 29, 1923.

1,456,859

UNITED STATES PATENT OFFICE.

GEORGIA ROBINSON, OF GRAND RAPIDS, MICHIGAN.

BOUQUET HOLDER.

Application filed September 11, 1922. Serial No. 587,499.

*To all whom it may concern:*

Be it known that GEORGIA ROBINSON, a citizen of the United States, residing at Grand Rapids, in the county of Kent and State of Michigan, have invented certain new and useful Improvements in Bouquet Holders, of which the following is a specification.

My invention relates to improvements in bouquet holders and shields for the protection of ladies' bodices when wearing bouquets of flowers thereon, and its objects are: first, to provide a means whereby the danger of soiling the bodice from moisture or coloring matter from the flowers, will be wholly obviated; second, to provide a means whereby the stems of the flowers will be wholly hidden from sight, and, third, to provide a means whereby the shield may be readily secured to the garments of the wearer.

I attain these objects by the construction and arrangement of parts shown in the accompanying drawing, in which Fig. 1 is an elevation of the holder and shield detached from the wearer. Fig. 2 is a plan of the same. Fig. 3 is an elevation of the same with a bouquet of flowers therein, and Fig. 4 indicates the position of the shield, carrying a bouquet of flowers, as it appears upon the wearer.

Similar reference numerals indicate similar parts throughout the several views.

I prefer that this shield be made of some waterproof material, as fancifully prepared waterproof fabric, oilcloth, or like material, preferably of a very pliable nature. In the drawing 1 represents the shield proper, which should be made of such a form as to positively insure against the possibility of the flowers or bouquet coming in contact with the bodice, and 2 represents a downwardly extending sack, open at the top for the reception of the stems of the flowers, the whole to be properly stitched and finished to make it an ornamental adjunct to the wearing apparel. 3 is a fancy ribbon that is attached to the shield, which may be tied around the shield, as indicated in Fig. 3, at 5, or may be carried around the waist of the wearer and tied at the back, as indicated in Fig. 4, thus forming an artistic belt as well as a perfect support for the bouquet holder, the broad attachment of the ribbon being sufficient to prevent the holder from inclining from its vertical position.

The part 1 of the shield should extend far enough upwardly, and laterally, to positively avert the danger of any moisture or coloring matter on the flowers from coming in contact with the bodice of the wearer.

In Fig. 3, the numeral 6 indicates an auxiliary shield, as of tissue paper, fine fabric, or like material, placed around the stems of the flowers that compose the bouquet 4, which auxiliary shield is designed to be moistened for the purpose of keeping the stems moist and the bouquet fresh while being worn, which I find to be one of the most desirable objects attained by the use of this holder and shield.

When the ribbons 3 are used as an ornament around, and tied in front of the holder, as in Fig. 3, it is necessary to secure the shield to the bodice by the use of pins, or other suitable devices of like nature.

It will be readily understood that this holder and shield may be worn an indefinite number of times without detracting from its appearance or value, and, further, that it may be readily cleaned if it becomes soiled from long or constant use, without, in any way, detracting from its usefulness, as the waterproof nature of the material from which it is made renders it susceptible of long use and positive cleanliness, with proper care from the person or persons using it.

Having thus fully described my invention, what I claim as new in the art, is:

1. In a combined bodice shield and bouquet holder, a broad flat shield of water proof material and a water proof sack connected therewith and extending downwardly therefrom.

2. In a combined bodice shield and bouquet holder for ladies' wear, a broad, flat shield having a sack depending from its lower edge for holding the stems of flowers, and a ribbon secured to the shield and extending laterally from each edge thereof.

Signed at Grand Rapids, Michigan, Sept. 8, 1922.

GEORGIA ROBINSON.